United States Patent
Vossiek et al.

(10) Patent No.: US 11,353,570 B2
(45) Date of Patent: Jun. 7, 2022

(54) RADAR SYSTEM AND METHOD FOR OPERATING A RADAR SYSTEM

(71) Applicant: Symeo GmbH, Neubiberg (DE)

(72) Inventors: Martin Vossiek, Fürth (DE); Michael Gottinger, Buckendorf (DE); Peter Gulden, Erding (DE)

(73) Assignee: Symeo GmbH, Neubiberg (DE)

(*) Notice: Subject to any disclaimer, the term of this patent is extended or adjusted under 35 U.S.C. 154(b) by 160 days.

(21) Appl. No.: 16/490,492

(22) PCT Filed: Feb. 26, 2018

(86) PCT No.: PCT/EP2018/054628
§ 371 (c)(1),
(2) Date: Aug. 30, 2019

(87) PCT Pub. No.: WO2018/158173
PCT Pub. Date: Sep. 7, 2018

(65) Prior Publication Data
US 2020/0018840 A1 Jan. 16, 2020

(30) Foreign Application Priority Data
Mar. 2, 2017 (DE) ...................... 10 2017 104 380.2

(51) Int. Cl.
*G01S 13/00* (2006.01)
*G01S 7/288* (2006.01)
(Continued)

(52) U.S. Cl.
CPC ............ *G01S 13/003* (2013.01); *G01S 7/288* (2013.01); *G01S 7/352* (2013.01); *G01S 7/4021* (2013.01)

(58) Field of Classification Search
None
See application file for complete search history.

(56) References Cited

U.S. PATENT DOCUMENTS

| 6,317,075 B1 | 11/2001 | Heide et al. |
| 7,940,743 B2 | 5/2011 | Seisenberger et al. |

(Continued)

FOREIGN PATENT DOCUMENTS

| DE | 10157931 A1 | 6/2003 |
| DE | 102008010536 | 8/2009 |

(Continued)

OTHER PUBLICATIONS

"International Application No. PCT/EP2018/054628, International Prelimnary Report on Patentability dated Sep. 12, 2019", (English Translation), 11 pgs.

(Continued)

*Primary Examiner* — Whitney Moore
(74) *Attorney, Agent, or Firm* — Schwegman Lundberg & Woessner, P.A.

(57) ABSTRACT

Transmitting-receiving devices, such as within a radar system, can use a clock generator from which various higher-frequency signals are derived. For example, respective transmitting-receiving devices can include high-frequency (HF) generators. The present subject matter concerns a system and a method for providing measurement signals having increased coherence as compared with signals originally transmitted by the transmitting-receiving devices. Such measurement signals can be exchanged for synchronization. Increased coherence can enhance overall system performance, such as to assist in separating returns associated with weaker targets from those associated with stronger targets, or to provide enhanced angular resolution, as illustrative examples.

15 Claims, 5 Drawing Sheets

(51) Int. Cl.
*G01S 7/35* (2006.01)
*G01S 7/40* (2006.01)

(56) References Cited

U.S. PATENT DOCUMENTS

2017/0176583 A1 6/2017 Gulden et al.
2018/0024233 A1 1/2018 Searcy et al.

FOREIGN PATENT DOCUMENTS

| DE | 102014104273 | 10/2015 |
|----|--------------|---------|
| EP | 3136122 A1 | 3/2017 |
| WO | WO-2017118621 | 7/2017 |
| WO | WO-2018158173 A1 | 9/2018 |

OTHER PUBLICATIONS

"International Application No. PCT/EP2018/054628, International Search Report and Written Opinion dated May 9, 2018", (May 9, 2018), 17 pgs.
Scheiblhofer, Stefan, et al., "Performance Analysis of Cooperative FMCW Radar Distance Measurement Systems", Microwave Symposium Digest, 2008 IEEE MIT-S International, IEEE, Piscataway, NJ, (Jun. 15, 2008), 121-124.
Schiessl, Andreas, et al., "Hardware realization of a 2 m x 1 m fully electronic real-time mm-wave imaging system", EUSAR 2012; 9th European Conference on Synthetic Aperture Radar, Nuremberg, Germany, Apr. 23-26, 2012 [abstract only], (Jun. 15, 2012), 1.
Siart, Uwe, "Phasenrauschen in Oszillatoren und Sensorsystemen", Retrieved from the internet: URL:http://www.siart.de/lehre/phasenrauschen.pdf [retrieved Apr. 25, 2018], (Sep. 15, 2013), 1-7.
Wojnowski, M., "A 77-GHz SiGe single-chip four-channel transceiver module with integrated antennas in embedded wafer-level BGA package", 2012 IEEE 62nd Electronic Components and Technology Conference, May 29-Jun. 1, 2012, San Diego, CA [abstract only], (Jul. 30, 2012), 2 pgs.
Zankl, Dominik, et al., "BLASTDAR—A Large Radar Sensor Array System for Blast Furnace Burden Surface Imaging", IEEE Sensors Journal, vol. 15, No. 10; abstract only, (Jun. 15, 2015), 5893-5909.

RADAR SYSTEM AND METHOD FOR OPERATING A RADAR SYSTEM

PRIORITY CLAIM TO RELATED APPLICATIONS

This application is a U.S. national stage filing under 35 U.S.C. § 371 of International Application No. PCT/EP2018/054628, filed on 26 Feb. 2018, and published as WO2018/158173 on 7 Sep. 2018, which claims priority to German Application No. 10 2017 104 380.2, filed on 2 Mar. 2017, the benefit of priority of each of which is claimed herein, and which applications and publication are hereby incorporated herein by reference in their entirety.

The present invention relates to a radar system and a method for operating a radar system.

In radar systems, there is substantial interest in reducing a measurement deviation of the angular measurement and increasing an angular resolution, i.e. the capability of separating several targets in terms of the angle. An increase in the angular measurement accuracy and resolution is achieved quite definitively by increasing the aperture of a radar antenna and an occupancy of this antenna with as many transmission and receiving paths as possible (see *Hardware Realization of a 2 m×1 m Fully Electronic Real-Time mm-Wave Imaging System*, A. Schliessl, A. Genghammer, S. Ahmed, L.-P. Schmidt, EUSAR 2012, as well as *BLAST-DAR—A Large Radar Sensor Array system for Blast Furnace Burden Surface Imaging*, D. Zankl et al., IEEE Sensor Journal, Vol. 15, No. 10, October 2015). This is usually accomplished at comparatively high transmission frequencies (e.g. 24 GHz, 61 GHz, 76-80 GHz, 122 GHz, 240 GHz and higher). At these high frequencies, the radar electronics is built on technically comparatively complex substrates. In addition, the distribution of signals with comparatively high frequencies is beset with irradiation losses and damping, which has a disadvantageous effect on a transmission power and a signal quality.

Solution measures for this are technically complex and demanding to implement.

It is therefore the object of the invention to propose a radar system and a corresponding method in which measurement deviations can be reduced in a simple manner and a comparatively good angular resolution can be achieved.

This object is solved in particular by a radar system according to claim 1.

In particular, the object is solved by a radar system comprising at least one first and one second transmitting-receiving device each having at least one transmitting and having at least one receiving antenna as well as an HF generator and a common clock generator for the HF generators of the transmitting-receiving devices, wherein at least one evaluation device is provided, which is configured to process transmitting and receiving signals of the transmitting-receiving devices to modified measurement signals with increased coherence.

An essential idea of the invention consists in processing transmitting and receiving signals of the transmitting-receiving devices using a common clock generator for the various HF generators so that these have an increased coherence (in the form of modified measurement signals). A method for increasing the coherence for distributed radar systems is known, for example, from DE 10 2014 104 273 A1. A corresponding radar system is also described in DE 10 2014 104 273 A1. The method according to DE 10 2014 104 273 A1 shall be described hereinafter as "method I". The configuration of the radar system according to DE 10 2014 104 273 A1 shall be described as "configuration I". A further method and a further configuration for a radar system for increasing the coherence is described from the German patent application having the application number 10 2016 100 107.4 which has not yet been published and the corresponding International Patent Application having the application number PCT/EP2017/050056. The method or radar system described in these two applications shall be designated hereinafter as "method II" and "configuration II". It has surprisingly been found that such methods for increasing the coherence also afford considerable advantages in a system having a common master clock for different HF generators. In particular, it has been shown that a comparatively high angular measurement accuracy and a comparatively good resolution can be achieved with simple means.

Fundamentally, it has been identified as desirable to generate all the HF signals in one radar system (only) in an immediate vicinity of the transmitting and receiving antennae or to integrate the transmitting and receiving antennae in a chip package or on the chip itself (see *A 77-GHz SiGe single-chip four-channel transceiver module with integrated antennas in embedded wafer-level BGA package*, M. Wojnowski; C. Wagner; R. Lachner; J. Bock; G. Sommer; K. Pressel; 2012). In this case, a separate generation of high-frequency transmitting and receiving signals can be performed in each case for the individual transmitting and receiving antennae, or for subgroups with several transmitting and receiving antennae. In addition, a current transmission signal can be mixed or correlated with received signals so that only one or more low-frequency signals need be guided to a processing unit. Optionally, a digitization can also be accomplished directly after the down-mixing or correlating. Furthermore, a mixing or correlation can optionally also be accomplished (directly) optionally.

According to an essential idea of the invention, several HF generators (of several transmitting-receiving devices) can be supplied from the same clock source. By using suitable phase-locked loops, HF signals which are coherent to one another can preferably be produced in the individual HF generators.

In addition, all the HF signals have the same reference clock, i.e. noise components of a clock generator (such as, for example, phase noise of a quartz oscillator) act uniformly on the HF signals in all the HF signals. As a result, the person skilled in the art actually initially expects a good functioning of such an arrangement. In practice, however, unexpected technical problems have arisen. It has now been identified that these problems result from the fact that independent HF oscillators (HF generators) and control loops are used in the signal generating paths. These can produce additional (independent) noise components in the HF signals, in particular phase noise components. Furthermore, the phase-locked loops (PLLs) can have different nonlinearities as a result of component tolerances, which can also result in systematic deviations. Thus, the down-mixed signals for signal components which were generated in one signal generator (HF generator) and received in another, exhibit additional noise and perturbation components. These additional noise components cause a deterioration in the accuracy of the radar system and reduce a dynamic range around (strong) targets, i.e. other (weaker) targets are concealed. According to the invention, these components are now solved by using a method for the subsequent generation of coherence. As a result, in particular weaker targets can be separated from stronger targets and in general, the measurement accuracy and resolution is improved.

The first transmitting-receiving device with its (associated) HF generator can be arranged on a (common) printed circuit board. Alternatively or additionally, the second transmitting-receiving device with its (associated) HF generator can also be arranged on a (common, optionally further) printed circuit board (chip). Likewise, the (common) clock generator as well as first transmitting-receiving device, second transmitting-receiving device (optionally with their respectively associated HF generators) can be arranged on a common printed circuit board (chip). In particular, transmitting and receiving antennae can already be provided in a corresponding transmitting-receiving device preferably configured as a chip package or integrated on a chip itself. As a result, measurement accuracy and resolution can be improved.

Preferably the HF generators are arranged in the vicinity of the transmitting and receiving antennae of the transmitting-receiving devices. An arrangement in the vicinity is to be understood in particular as an arrangement at a distance of less than 20 mm, preferably less than 10 mm.

Preferably the HF signals of the (individual) HF generators are at least partially coherent with respect to one another. Further preferably a phase locked loop (PLL) is provided for this purpose.

In this context, it has been shown that even with fundamentally (partially) coherent HF signals, an increase in the coherence with method I or method II yields an appreciable gain with regard to the quality of the measurement results.

In one embodiment, the increase in coherence is accomplished according to method I or according to configuration I. The transmitting-receiving units (SE) mentioned in DE 10 2014 104 273 A1 are preferably components of the transmitting-receiving devices of the present disclosure or correspond to these (apart from the fact that the original signals in the present disclosure can optionally also be partially coherent with respect to one another, non-coherent output signals in the sense of DE 10 2014 104 273 A1 are not necessarily present. Preferably in the first transmitting-receiving device, a first signal can be generated and transmitted over a path, in particular emitted, in the second transmitting-receiving device, a further first signal can be generated and transmitted over the path, in particular emitted, in the evaluation device, in particular in the first transmitting-receiving device, a first comparative signal can be formed from the first signal of the first transmitting-receiving device and from such a first signal received from the second transmitting-receiving device via the path and in the evaluation device, in particular in the second transmitting-receiving device, a further comparative signal can be formed from the first signal of the second transmitting-receiving device and from such a first signal received from the first transmitting-receiving device via the path, wherein the further comparative signal is preferably transmitted, in particular communicated, from the second transmitting-receiving device to the first transmitting-receiving device. Further preferably, the system, in particular the evaluation device, is configured to form a comparative signal from the first comparative signal and the further comparative signal. Further embodiments and specifications of the method I are obtained from DE 10 2014 104 273 A1, the disclosure of which should herewith by reference be part of the present disclosure (in particular with a view to the methods and configurations described there to increase or produce coherence).

In a particularly preferred embodiment, configuration II or method II is used to increase the coherence. The disclosure of the not yet published German patent application having the application number 10 2016 100 107.4 and the corresponding International Patent Application having the application number PCT/EP2017/050056 which describe method II or configurations II, is herewith by reference part of the disclosure of the present disclosure [sic], in particular with a view to the configurations or methods described there to increase or produce coherence. Preferably the system, in particular the evaluation device, is configured, in a first step, to compensate for deviations of the comparative signals which are caused by systematic deviations in the transmitting-receiving devices and in a second step, to use at least one complex value from a first of the two comparative signals or from a signal which was derived from this first comparative signal, to adapt at least one complex value of the second of the two comparative signals or a value of a signal which was derived from this second comparative signal, and thus form an adapted signal, wherein the adaptation is accomplished in such a manner that by means of a mathematical operation, the vectorial sum or the difference of the complex values is formed or the sum or the difference of the phases of the complex values is formed. With such a configuration (or a corresponding method) to increase the coherence, particularly good results can be achieved with regard to the resolution and measurement accuracy. In particular, a good result can be achieved with comparatively low processing expenditure (in particular with respect to method I or configuration I).

In an alternative embodiment, the (above) comparative-comparative signal, whereby the two comparative signals are processed together—in particular complex conjugate multiplied, corresponds to a comparative signal produced by a coherent radar system.

Preferably the transmitting-receiving devices are arranged underoccupied in a sparse array). As a result, the accuracy and target separation are further improved, in particular since auxiliary maxima (side lobes) and the overall aperture are further optimized. An underoccupied array (sparse) array should be understood in particular as an array in which a spacing between the individual transmitting-receiving devices (antennae) is greater than $\lambda/2$ ($\lambda$=(average) wavelength of the transmitted signals).

Preferably, the first and/or second transmitting-receiving device comprises/comprise two or more transmitting antennae and/or two or more receiving antennae.

The system, in particular the control device of the system, can be configured so that the transmitting antenna(e) of the first and the transmitting antenna(e) of the second transmitting-receiving device transmit simultaneously or in a time-overlapping manner and/or so that the transmission signals of the transmitting antenna(e) of the first and the transmitting antenna(e) of the second transmitting-receiving device differ from one another, in particular have a frequency offset with respect to one another and/or differ from one another by a pulse, amplitude and/or phase modulation. In particular, in a first step at least two different transmission paths $S1_{TX}$ and $S2_{TX}$ which are supplied by different HF generators, are supplied (almost) simultaneously or in a time-overlapping manner: "almost simultaneously" means in particular that the transmission signals $S1_{TX}$ and $S2_{TX}$ are transmitted in a time-overlapping manner at least for a large part of their signal duration (for example, over at least 50% or at least 70& of the signal duration of $S1_{TX}$). The transmission signals $S1_{TX}$ and $S2_{TX}$ can in this case either have a frequency offset with respect to one another or another possibility for distinguishing, e.g. by means of a pulse, amplitude and/or phase modulation. The signals received from each receiving path then contain the dedicated signals reflected from the surroundings and the signals reflected from the surroundings of the second transmission path.

Preferably the system, in particular a/the control device of the system is configured so that received signals are mixed or correlated, wherein preferably a separation of the received signals is then accomplished on the basis of a distinguishing feature, in particular a frequency offset with respect to one another and/or a distinguishing pulse, amplitude and/or phase modulation of the transmission signals to which the received signals are attributed. As a result, a low-frequency signal $S1_{beat}$ can be produced, which has both components from the direct reflection path (dedicated transmission signal) and from the indirect reflection path (external transmission signal). Then the frequencies can be separated by means of a frequency difference or another type of modulation. The signals of the dedicated reflection path can then be processed as normal radar signals, the signals of the indirect path can optionally be further processed.

The above object is further solved by a method for operating a radar system, in particular as described above, wherein the radar system comprises at least one first and one second transmitting-receiving device each having at least one transmitting and having at least one receiving antenna as well as an HF generator and a common clock generator for the HF generators of the transmitting-receiving devices, wherein transmitting and receiving signals of the transmitting-receiving devices are processed to form measurement signals with increased coherence.

Preferably in the first transmitting-receiving device, a first signal is generated and transmitted over a path, in particular emitted, in the second transmitting-receiving device, a further first signal is generated and transmitted over the path, in particular emitted, a first comparative signal is formed from the first signal of the first transmitting-receiving device and from such a first signal received from the second transmitting-receiving device via the path and a further comparative signal is formed from the first signal of the second transmitting-receiving device and from such a first signal received from the first transmitting-receiving device via the path, wherein the further comparative signal is preferably transmitted, in particular communicated, from the second transmitting-receiving device to the first transmitting-receiving device and/or wherein preferably a comparative-comparative signal is formed from the first comparative signal and the further comparative signal and/or wherein in a first step, deviations of the comparative signals which are caused by systematic deviations in the transmitting-receiving devices are compensated and in a second step, at least one complex value from a first of the two comparative signals or from a signal which was derived from this first comparative signal, is used to adapt at least one complex value of the second of the two comparative signals or a value of a signal which was derived from this second comparative signal, and thus form an adapted signal, wherein the adaptation is accomplished in such a manner that by means of a mathematical operation, the vectorial sum or the difference of the complex values is formed or the sum or the difference of the phases of the complex values is formed.

High-frequency (HF) should be understood in particular as a frequency of at least 100 MHz, preferably at least 1 GHz, further preferably at least 10 GHz.

A path should be understood in particular as an (air) interface, via which the corresponding signals (and optionally comparative signals) can be sent or transmitted and received by means of antennae.

An indirect path or a cross path should be understood in particular as the path of a signal which originates from a (for example, the second) transmitting-receiving device and is received by another (for example, the first) transmitting-receiving device. Accordingly, a direct path should be understood as a signal which is transmitted and also received (as reflected signal) by one and the same transmitting-receiving device.

A non-coherent transmitting-receiving device) or transmitting-receiving unit) should be understood as a transmitting-receiving device (transmitting-receiving unit, the transmitted signal of which in relation to the signal of a further transmitting-receiving device (transmitting-receiving unit) is non-coherent or only partially coherent (compared to a signal with increased coherence) (also if the signal of the first transmitting-receiving device/transmitting-receiving unit or the further transmitting-receiving device/transmitting-receiving unit is inherently coherent).

Insofar as calculations, evaluations and other process steps are carried out in the (respective) transmitting-receiving device, this also includes an optionally physically independent evaluation device which is connected to the transmitting-receiving device. For example, the respective transmitting-receiving device can thus be configured as an arrangement of in particular one or more antennae having some (a few) signal-generating or signal-processing components whereas further components such as signal comparing units or an evaluation device can be connected to such an arrangement as constructively independent components. Insofar as components are used, these can (insofar as is technically feasible) be configured as so-called hardware from processing components and/or implemented as signal or data processing steps executed completely or partially in a processor.

In general, the evaluation device can be part of one or more transmitting-receiving devices or can be connected to one or more such transmitting-receiving device(s). Optionally, a physically independent evaluation device can be provided which is connected to the respective transmitting-receiving device or the other components of the respective transmitting-receiving device. Alternatively, the evaluation device can optionally be integrated into the first and/or the second (generally further) transmitting-receiving device, for example, in a common housing and/or as structural unit.

In each case (regardless of where specifically the evaluation device is arranged), it is crucial that a cross path (indirect path) can be formed, i.e. that an overlap of transmitting and receiving regions is accordingly provided.

Hereinafter, the method II or the configuration II is further described, wherein the (non-coherent) transmitting and receiving units should be part of (or should form these) the transmitting-receiving device which have already been described. The transmitting-receiving units are also abbreviated to SE.

According to method II, signals transmitted between the SE are processed in such a manner that comparative signals are formed, which have advantageous properties which otherwise actually only comprise radar signals which operate with only one common device for signal generation, i.e. with a coherent signal source. The subject of method II in particular are methods for reducing perturbing effect caused by the non-correlated phase noise of several independent devices for signal generation.

Method II can be applied particularly advantageously to the transmitting-receiving devices according to the invention.

In the area of radar signal processing, the aim is to converted the received signals to the lowest-possible noise intermediate frequency signal in order to achieve a high accuracy and large range. In this case, it should be assumed that there are several propagation paths between transmitter and receiver. In principle, it is possible to suppress the received multiple-path propagations and correlated noise components by bandpass filtering using a filter tuned exactly to the expected frequency. In practice, however, this method is difficult to implement since synchronization errors of the scanning times and the local oscillator frequencies in the respective SEs only allow an exact prediction of the beat signals generated after the mixing process to a limited extent. As a result of these problems, the correlation of the phase noise of these two signals is reduced and the estimation error of the phase increases.

Methods with calculation steps in which the influences of phase noise and synchronization errors are reduced or completely suppressed are therefore advantageous.

The method II therefore begins with at least two SE transmitting almost simultaneously. Almost simultaneously means in this context that the transmission signals sigTX1 and sigTX2 are transmitted at least for a large part of their signal duration in both directions, i.e. sigTX1 from SE1 to SE2 and sigTX2 from SE2 to SE1. The initially possibly unknown difference between the starting times of the transmission signals sigTX1 and sigTX2 is designated as T_off. As far as possible the same transmission times should be strived for, the displacement T_off should preferably not be greater than half the signal duration, in any case however less than the signal duration. In this case, as a result of the at least partially independent generation, the signals sigTX1 and sigTX2 have non-correlated signal components which can be attributed to the phase noise of the signal sources in the stations SE1 and SE2.

In such an arrangement, preferably the same antennae are used for transmitting (Tx) and for receiving (Rx), to ensure the reciprocity of the transmission channels. In the case of arrangements in an array (e.g. with MIMO), it should be ensured that preferably at least one of the transmission paths is reciprocal. The use of a transmission mixer in at least one transmitting and receiving path of the SE is particularly suitable for achieving the reciprocity. An exemplary embodiment of a transmission mixer in a radar arrangement is explained, for example, in U.S. Pat. No. 6,317,075 B1.

As a further step, the comparative signals (sigC21; sigC12) are then formed in each SE and specifically between the respectively received signal and the transmission signal or with a component of the transmission signal correlated with the transmission signal in relation to the phase noise. The method for forming these comparative signals corresponds to the procedure in patent application DE 10 2014 104 273 A1.

According to the invention, phase noise and synchronization errors are then at least reduced by carrying out the processing of the received signals in two stages: as a first step, systematic deviations are corrected either before receiving the signals by means of an actuation of the signal source and/or by means of a compensation directly in the received signal and/or by means of a compensation in the comparative signal. As a second step, then for example a shortened evaluation of the correlation is made or the formation of a comparative-comparative signal only for the predicted displacement range or in the best case, in only one displacement value.

In the second step, in method II other than executed in DE 10 2014 104 273 A1, it is particularly advantageous to use no multiplication for phase compensation but an addition of the complex signals. The use of addition instead of multiplication is possible due to the previously described first step of the processing, i.e. due to the previous compensation of systematic deviations.

A multiplication or division of the signals is a nonlinear operation. Nonlinear operations are always accompanied by nonlinear effects, i.e. here in particular by so-called intermodulations of signal and noise components. This particularly results in perturbations in radar signals having several signal components, i.e. in signals which have several targets or several transmission paths. The use of the addition of the complex signals proposed according to method II has the major advantage that the addition is a linear operation, with the result that nonlinear effects, i.e. in particular intermodulations of signal and noise components are avoided. This embodiment therefore usually results in a significantly better reduction of the phase noise compared to the method for combining the comparative signals sigC21 and sigC12.

As a result, in method II the phase noise/the influence of the phase noise is suppressed without the aforementioned additional perturbing influences occurring, such as would be expected in DE 10 2014 104 273 A1. In addition, this approach is technically advantageous since it requires a significantly lower processing expenditure than the complete multiplication or correlation proposed as an embodiment in DE 10 2014 104 273 A1.

In order to be able to carry out the process according to method II, preferably firstly a precise, either direct (by controllable hardware) and/or synthetic (computational) synchronization is carried out in order to compensate for the frequency offset (as far as possible). A linearized analysis can then be used, which only brings about a cancelling of the correlated component of the perturbation in the case of small, residual phase differences (principle shown in FIG. 3).

In this case, the synchronization can be carried out separately before the measurement, in the course of the measurement itself or following the measurement. When a synchronization is carried out in the course of the measurement or following the measurement, the synchronization can be carried out, for example, by means of a subsequent adaption of the comparative signal.

For the synchronization, means or methods can be provided which are suitable for adapting the clock rates of the sources of sigTX1 and sigTX2 to one another either directly (e.g. by means of TCXO) or computationally (synthetic synchronization).

All known methods for matching clock sources in distributed stations can be used. Particularly advantageous approaches for synchronization are methods according to U.S. Pat. No. 7,940,743, according to patent application DE 102008010536 or the exchange of reference clocks or reference signals. Another method for clock matching within the measurements for FMCW signals is described further below.

All these methods for matching the clock sources can either be implement via radio waves or via cable connections. Cable-bound can mean electrical signals or optical signals, which are guided by cables.

Alternatively or for improvement to the methods for matching clock sources, very high-quality clock sources, for example, atomic clocks can also be used.

After the synchronization step, signals (sigEP21, sigEP12) can be derived from the comparative signals, which each represent a function which has the signal transit time or the length of the transmission channel of the respective signal components as the function argument.

The offset T_off between the stations is then determined for example, by the method disclosed in DE 101 57 931 or by a correlation of the comparative signals of the at least two SE. In this case, the maximum can deliver the offset. Alternatively, the method described further below for FMCW signals can also be used. As previously, the methods can be cable-bound or implemented by means of radio waves.

At least one function value F1 can be determined from the signal sigEP21, which can be assigned to a specific transit time and at least one further function value F2 of the signal sigEP12, which can be assigned as exactly as possible to the same transit time. F1 is then calculated together with F2. This calculation is made, for example, by an addition or forming the difference of the two transit time values.

Thus, perturbations [caused] by the non-correlated signal components of the signals sigTX1 and sigTX2 which can be eliminated to the phase noise of the signal sources can be eliminated or at least reduced.

The steps of method II are summarized as follows:

Method for reducing perturbations due to phase noise in a radar system in which
  in a first (non-coherent) transmitting-receiving unit (SE1), a first signal (sigTX1) is generated and transmitted over a path (SP), in particular emitted
  in a further, in particular second (non-coherent) transmitting-receiving unit (SE2), a (further) first signal (sigTX2) is generated and transmitted over the path (SP), in particular emitted,
  the signals (sigTX1 and sigTX2) are received in the respectively other transmitting-receiving unit on the direct or indirect path and are further processed there as receiving signals sigRX12 and sigRX21,
  in the first transmitting-receiving unit (SE1), a comparative signal (sigC12) is formed from the first signal (sigTX1) and from such a first signal (sigRTX2) received from the further transmitting-receiving unit (SE2) via the path (SP) and
  in the further transmitting-receiving unit (SE2), a further comparative signal (sigC21) is formed from the first signal (sigTX2) and from such a first signal (sigTX1) received from the first transmitting-receiving unit (SE1) via the path (SP),
  wherein the further comparative signal (sigC21) is transmitted, in particular communicated, from the further transmitting-receiving unit (SE2) to the first transmitting-receiving unit (SE1),
  wherein in a first step, deviations of the signals sigC21 and sigC12, which are caused by systematic deviations in the transmitting-receiving units (SE2, SE1) are compensated,
    wherein in a second step, at least one complex value from a first of the two comparative signals or from a signal which was derived from this first comparative signal, is used to adapt at least one complex value of the second of the two comparative signals or a value of a signal which was derived from this second comparative signal, and thus form an (adapted) signal (sigCC),
  wherein the adaptation is accomplished in such a manner that by means of a mathematical operation, the vectorial sum or the difference of the complex values is formed or the sum or the difference of the phases of the complex values is formed.

Exemplary embodiments are explained in detail hereinafter with reference to the figures. In the figures.

Figure 1:
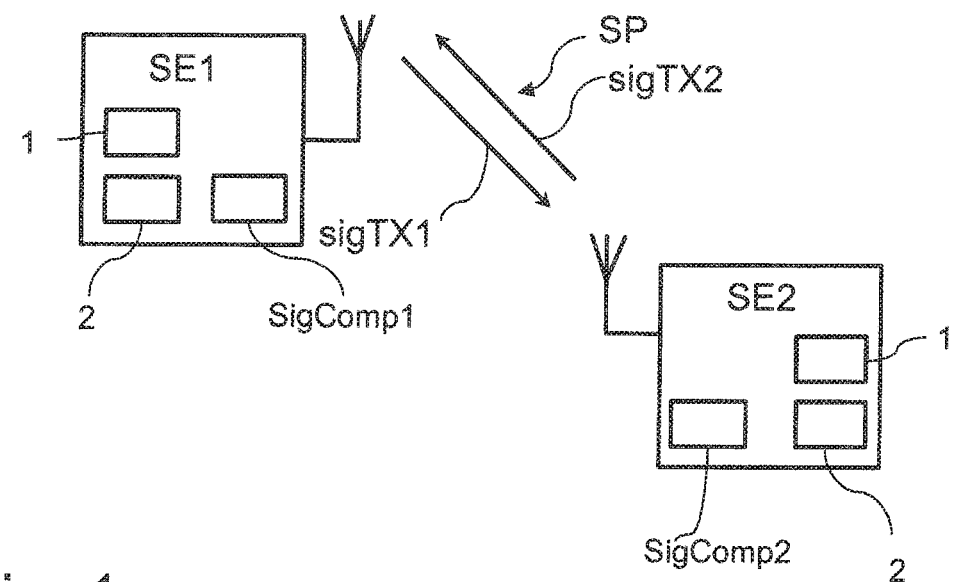
FIG. 1 shows two inter-communicating transmitting-receiving units and individual components thereof.

As can be seen from FIG. 1 two transmitting-receiving units SE1, SE2 communicate with one another via a radio interface. In this case, a first or a second signal sigTX1, sigTX2 is transmitted. The transmitting-receiving units SE1, SE2 each have a signal source 1, a unit for clock matching or comparative signal modification 2 and a transmission comparison unit (SigComp1, SigComp2). The (non-coherent) transmitting-receiving units preferably form transmitting-receiving devices. Thus hereinafter, SE1 can be seen as a first transmitting-receiving device and SE2 as a second transmitting-receiving device.

Figure 2:
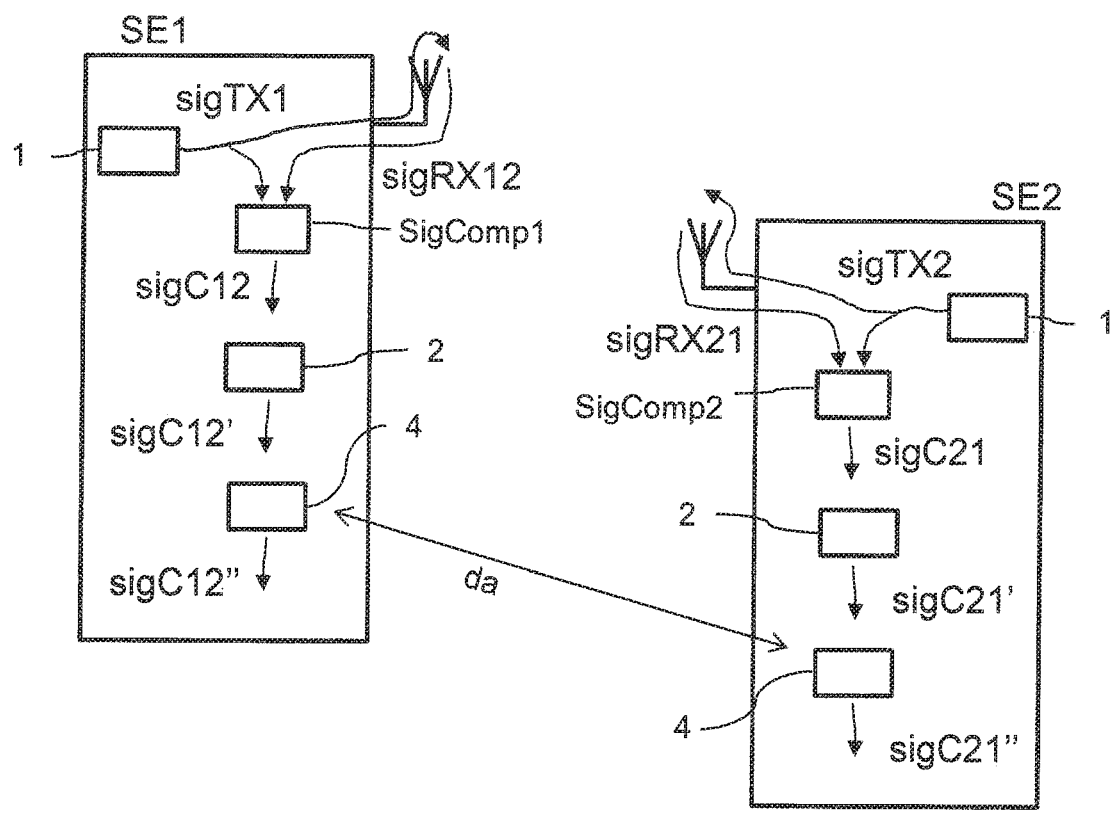
FIG. 2 shows the components from FIG. 1 with illustration of a process sequence.

FIG. 2 additionally shows respectively one unit for phase modification 4. Data exchange takes place between the two units for phase modification 4.

Hereinafter the exact mathematical derivation of the operation mode of the method II is performed. In a first (non-coherent) transmitting-receiving unit (SE1), a first signal (sigTX1) is generated and sent over a path (SP), in particular emitted. In a further, in particular second (non-coherent) transmitting-receiving unit (SE2), a second signal (sigTX2) is generated and sent via the path (SP), in particular emitted. In this case, the emission of the signals takes place as far as possible simultaneously but at least temporally matched to one another so that the two signal forms preferably overlap at least half the transmission time. The signal sources can be completely or partially independent.

As is usual in communications engineering, the transmission signals used (siTX1, sigTX2) can be represented as broken down into an equivalent base band signal (bbTX1) and a carrier signal.

Since the system according to the invention should preferably be used for distance measurement or for imaging, preferably signals with so-called good correlation properties can be used as base band signals. Signals with good correlation properties are, for example, wide-band pulses, noise signals, pseudo-random pulse sequences (PN codes) such as M sequences, Gold codes or Barker codes, Kasami sequences, Huffmann sequences, chirps, linear frequency-modulated signals (FMCW), chirp or FMCW sequences etc. Such signal forms have been known for a long time and in many forms in radar technology and communications technology (in particular in the area of CDMA).

The transmission signal (sigTX1) of the transmitting-receiving unit (SE1) can be represented as follows:

$$sigTX1(t) = \mathrm{Re}\{bbTX1(t-T_{01}) \cdot e^{j(\omega_{c1}(t-T_{01})+\phi TX1(t-T_{01}))}\}.$$

The time offset T01 defines the transmission time of the signal sigTX1;
the phase term $\phi TX1(t)+\varphi TX1+\xi TX1(t)$ comprises a constant phase offset and the phase noise of the carrier signal.

The circular frequency $\omega_{c1}$ characterizes the frequency of the carrier signal of sigTX1.

The transmission signal (sigTX2) of the transmitting-receiving unit (SE2) can be formed in the same way. It holds that:

$$sigTX2(t) = \text{Re}\{bbTX2(t-T_{02}) \cdot e^{j(\omega_{c2}(t-T_{02}) + \phi TX2(t-T_{02}))}\}$$

The transmitted signals (sigTX1 and sigTX2) arrive—on the direct path or reflected at objects—at the respectively other transmitting-receiving station and are received then and further processed as receiving signals sigRX12 and sigRX21.

The receiving signal, which is received at the second (non-coherent) transmitting-receiving unit (SE2) corresponds to the transmission signal (sigTX1), wherein however this is changed in amplitude and delayed by the transit time $\tau_{21}$. To simplify the mathematical representation and without restricting the general disclosure, all the signals should subsequently be represented as complex-value signals. It therefore holds that:

$$sigRS21(t) = ARX21 \cdot bbTX1(t-T_{01}-\tau_{21}) \cdot e^{j(\omega_{c1}(t-T_{01}-\tau_{21})+\phi TX1(t-T_{01}-\tau_{21}))}$$

If the transmission signal (sigTX1) is transmitted on several (a number of I) different-length transmission paths to the second transmitting-receiving unit (SE2), the receiving signal can be represented as follows as a linear superposition of amplitude-weighted and time-delayed signals as follows:

$$sigRX21(t) = \sum_{i=1}^{I} sigRX21i(t)$$

where $$sigRX21i(i) = ARX21i \cdot bbTX1(t-T_{01}-\tau_{21}) \cdot e^{j(\omega_{c1}(t-T_{01}-\tau_{221})+\phi TX1(t-T_{01}-\tau_{222}))}$$

For the signal transmitted from the second transmitting-receiving unit (SE2) to the first transmitting-receiving unit (SE1), it holds accordingly that $$sigRX12(t) =$$
$$ARX12 \cdot bbTX2(t-T_{02}-\tau_{12}) \cdot e^{j(\omega_{c2}(t-T_{02}-\tau_{12})+\phi TX2(t-T_{02}-\tau_{12}))}$$

or $$sigRX12(t) = \sum_{i=1}^{I} sigRX12i(t)$$

where $$sigRX12i(i) = ARX12i \cdot bbTX2(t-T_{02}-\tau_{121}) \cdot e^{j(\omega_{c2}(t-T_{02}-\tau_{02}-\tau_{11})+\phi TX2(t-T_{01}-\tau_{12}))}$$

The transmitting-receiving units (SE1, SE2) are designed so that they comprise signal comparison units SigComp1, SigComp2 in which the respective receiving signals of a transmitting-receiving unit is calculated with its transmitting signal—i.e. in SE1 the signal sigRX12 with the signal sigTX1 and in SE2 the signal sigRX21 with the signal sigTX2. The signal comparison units SigComp1, SigComp2 are executed as a mixer Mix in the exemplary embodiment. That is, here in SE1 the signal sigRX12 is mixed with the signal sigTX1 and in SE2 the signal sigRX21 is mixed with the signal sigTX2. It is generally known as such that a mixing process can be expressed system-theoretically as multiplication or a down-mixing in the case of two complex sine signals as multiplication of the signals with the complex conjugate (*=sign for conjugation) of the other signal. It therefore holds that:

$$sigC12 = sigRX12^* \cdot sigTX1$$
$$= ARX12 \cdot bbTX2^*(t-T_{02}-\tau_{12}) \cdot e^{-j(\omega_{c2}(t-T_{02}-\tau_{12})+\phi TX2(t-T_{02}-\tau_{12}))} \cdot$$
$$bbTX1(t-T_{01}) \cdot e^{j(\omega_{c1}(t-T_{01})+\phi TX1(t-T_{01}))}$$
$$= ARX12 \cdot bbTX2^*(t-T_{02}-\tau_{12}) \cdot bbTX1(t-T_{01}) \cdot$$
$$e^{j(\omega_{c1}(t-T_{01})+\phi TX1(t-T_{01})-\omega_{c2}(t-T_{02}-\tau_{12})-\phi TX2(t-T_{02}-\tau_{12}))}$$

Another advantageous case consists in forming a comparative signal in that SE1 does not mix the signal sigRX12 with the signal sigTX1 but only with its carrier. That is:

$$sigC12 = sigRX12^* \cdot e^{j(\omega_{c1}(t-T_{01})+\phi TX1(t-T_{01}))} = ARX12 \cdot bbTX2^*$$
$$(t-T_{02}-\tau_{12}) \cdot e^{j(\omega_{c1}(t-T_{01})+\phi TX1(t-T_{01})-\omega_{c2}(t-T_{02}-\tau_{12})-\phi TX2(t-T_{02}-\tau_{12}))}$$

For the signals in the SE2 it holds accordingly:

$$sigC21 = sigRX21^* \cdot sigTX2$$
$$= ARX21 \cdot bbTX1^*(t-T_{01}-\tau_{21}) \cdot e^{-j(\omega_{c1}(t-T_{01}-\tau_{21})+\phi TX1(t-T_{01}-\tau_{21}))} \cdot$$
$$bbTX2(t-T_{02}) \cdot e^{j(\omega_{c2}(t-T_{02})+\phi TX2(t-T_{02}))}$$
$$= ARX21 \cdot bbTX1^*(t-T_{01}-\tau_{21}) \cdot bbTX2(t-T_{02}) \cdot$$
$$e^{j(\omega_{c2}(t-T_{02})+\phi TX2(t-T_{02})-\omega_{c1}(t-T_{01}-\tau_{21})-\phi TX1(t-T_{01}-\tau_{21}))}$$

or in the alternative embodiment:

$$sigC21 =$$
$$sigRX21^* \cdot e^{j(\omega_{c2}(t-T_{02})+\phi TX2(t-T_{02}))} = ARX21 \cdot bbTX1^*(t-T_{01}-\tau_{21}) \cdot$$
$$e^{j(\omega_{c2}(t-T_{02})+\phi TX2(t-T_{01}-\tau_{21})-\omega_{c1}(t-T_{01}-\tau_{21})-\phi TX1(t-T_{01}-\tau_{21}))}$$

It is now assumed that means are provided in SE which ensure that the following conditions are satisfied:

$$T_{01}=T_{02}=T_0 \text{ and } \omega_{c2}=\omega_{c1}=\omega_c$$

How these means can preferably be configured has already been explained above or will be explained further below in an exemplary embodiment. Under these boundary conditions, it follows:

$$sigC12 = ARX12 \cdot bbTX2^*(t-T_0-\tau_{12}) \cdot bbTX1$$
$$(t-T_0) \cdot e^{j(\omega_c(t-T_0)+\phi TX1(t-T_0)-\omega_c(t-T_0-\tau_{12})-\phi TX2(t-T_0-\tau_{12}))} =$$
$$ARX12 \cdot bbTX2^*(t-T_0-\tau_{12}) \cdot bbTX1$$
$$(t-T_0) \cdot e^{j(\omega_c \tau_{12}+\phi TX1(t-T_0)-\phi TX2(t-T_0-\tau_{12}))}$$

$$sigC21 = ARX21 \cdot bbTX1^*(t-T_0-\tau_{21}) \cdot bbTX2$$
$$(t-T_0) \cdot e^{j(\omega_c(t-T_0)+\phi TX1(t-T_0)-\omega_c(t-T_0-\tau_{21})-\phi TX1(t-T_0-\tau_{21}))} =$$

-continued $$ARX21 \cdot bbTX1^*(t-T_0-\tau_{21}) \cdot bbTX2$$
$$(t-T_0) \cdot e^{j(\omega_c \tau_{21} + \phi TX1(t-T_0) - \phi TX2(t-T_0-\tau_{21}))}$$

If a reciprocal transmission channel is assumed, it further holds that:

$$\tau_{21} = \tau_{12} = \tau$$

In the next step with a data communication it is ensured that both comparative signals are transmitted to a common evaluation unit and both are present there for the evaluation. The common evaluation unit can be SE1, SE2 or another evaluation unit.

Now in a further processing step, the phases of the two comparative signals are added. If only the carrier phases with the phase noise component are considered here, since unknown phase contributions are present in this component and the two carrier phase terms are added, this gives:

$$\Delta \phi = (\omega_c \tau + \phi TX1(t-T_0) - \phi TX2(t-T_0-\tau)) +$$
$$(\omega_c \tau_{21} + \phi TX2(t-T_0) - \phi TX1(t-T_0-\tau_{21})) = 2\omega_c \tau +$$
$$\phi TX1(t-T_0) - \phi TX1(t-T_0-\tau) + \phi TX2(t-T_0) - \phi TX2(t-T_0-\tau)$$

If it is now borne in mind that as a result of the high propagation velocity of electromagnetic waves, the transit time τ is usually very short and that the definitive phase noise components in an oscillator according to the known relationships of oscillator phase noise typically decrease substantially with increasing distance from the carrier, and φTX1 or φTX2 consequently exhibit a defined low-pass behaviour and specifically a low pass behaviour with a limiting frequency, which is usually significantly less than 1/τ, it follows that:

$$\delta\phi1(1) = \phi TX1(t-T_0) - \phi TX1(t-T_0-\tau) \text{ where } \delta\phi1(t)$$
$$\ll \phi TX1(t)$$

$$\delta\phi2 = \phi TX2(t-T_0) - \phi TX2(t-T_0-\tau) \text{ where } \delta\phi2(t) \ll \phi TX2(t)$$

The proposed processing whereby in one of the comparative signals the phase of the respectively other comparative signal is added, therefore has the result that the perturbations due to phase noise are reduced quite considerably. This phase noise reduction results in a better detectability of targets, a larger measurement range and an improved measurement accuracy.

Depending on the selected mixer topology, whether for example a same-position or an inverted position mixer, is used, it is possible that the phase terms presented above have different signs. Depending on the sign, the preferred linking of the phase terms, is not necessarily an addition but possibly also a subtraction. It is crucial that the link results in a reduction of the phase noise terms and the transit-time-dependent phase term, i.e. an expression comprising the term $\omega_c T$ is maintained. It is further generally known that for the case where the phase values are represented by complex numbers, the complex numbers are multiplied by one another, divided or multiplied with the complex conjugate of the respectively other number in order to form the sum or the difference of the phases.

A possible preferred variant for reducing the phase noise components shall be described in the following. In many cases, it is favourable that in the first and second (non-coherent) transmitting-receiving unit (SE1, SE1) base band signals of the same type are generated, i.e. it holds that:

$$bbTX1 = bbTX2 = bbTX.$$

In an at least approximately reciprocal radio channel, it should further be assumed that:

$$ARX12 = ARX21 = ARX.$$

Under these boundary conditions, it follows that:

$$sigC12 = ARX \cdot bbTX^*(t-T_0-\tau_{12}) \cdot bbTX(t-T_0) \cdot$$
$$e^{j(\omega_c \tau + \phi TX1(t-T_0) - \phi TX2(t-T_0-\tau))}$$

$$sigC21 = ARX \cdot bbTX^*(t-T_0-\tau_{21}) \cdot bbTX(t-T_0) \cdot$$
$$e^{j(\omega_c \tau + \phi TX2(t-T_0) - \phi TX1(t-T_0-\tau))}$$

As can easily be identified, the two signals are identical apart from their phase terms.

Easily distinguishable amplitudes of the signals sigC12 and sigC21 can occur, however, despite a reciprocal radio channel as a result of different properties of the electronic components such as mixers or amplifiers etc. If the amplitudes of the signals sigC12 and sigC21 are different, in the preferred variant described here the signals must initially be normalized to the same amplitude.

During the process for forming the signals sigC12 and sigC21, additional systematic phase offsets can also occur. If these phase offsets of the signals sigC12 and sigC21 are different, in the preferred variant described here, these phase offsets must be initially compensated.

For a certain time t, the signals sigC12 and sigC21 can be interpreted as complex indicators. As a result of a complex addition of the indicators, the vector components of the phase terms with different signs cancel out in the same manner as was described above in the addition of the phase terms. Consequently, as a possible preferred variant for reducing the phase noise components it is proposed to add the complex signals sigC12 and sigC21, i.e., to form a signal as follows:

$$sigCC = sigC12 + sigC21$$

The signal sigCC then has a significantly lower phase noise than the signal sigC12 or sigC21 and the signal sigCC is then used further for the purpose of distance measurement, angular measurement or for imaging. However, it is important that before the addition of the signals, the previously described systematic deviations of amplitude and phases which cause different carrier frequencies and transmission times, were compensated.

Naturally not all values of sigC12 and sigC21 and also certainly not the signals sigC12 and sigC21 themselves must be added. However, at least one complex value from a first of the two comparative signals and from a signal that was derived from this first comparative signal should be used to adapt at least one complex value of the second of the two comparative signals or a value of a signal that was derived from this second comparative signal and thus form at least one value of a signal (sigCC), wherein the adaptation is made in such a manner that by means of a mathematical operation the vectorial sum or the difference of at least two complex values derived from sigC12 and sigC21 is formed or the sum or the difference of the phases of these complex values is formed.

It should be pointed out here that the proposed mixing processes only form a possible embodiment and that the compensations of the phase noise components could also be achieved by alternative methods. Thus, possibly all the high-frequency signals could already be digitized before mixing, i.e. scanned with an analog-to-digital converter and all further operations could be accomplished computationally or digitally, for example, in a processor or FPGA (field-programmable gate array).

In principle, the transmitted signals sigTX1 and sigTX2 can be modulated. Preferably in this case (before the mathematical operation), the spectra of the comparative signals are normalized to the highest value.

A special embodiment of method II with FMCW signals and a plurality of successive N ramps is described hereinafter. In this case, the SE transmit several N signals with linearly increasing or decreasing frequency, hereinafter designated as frequency ramps. The comparative signals are then generated from the received signals in the SE and buffered for further processing. For example, ascending and descending ramps are used since a correct-sign determination of the relative speed is herewith possible.

Figure 4:
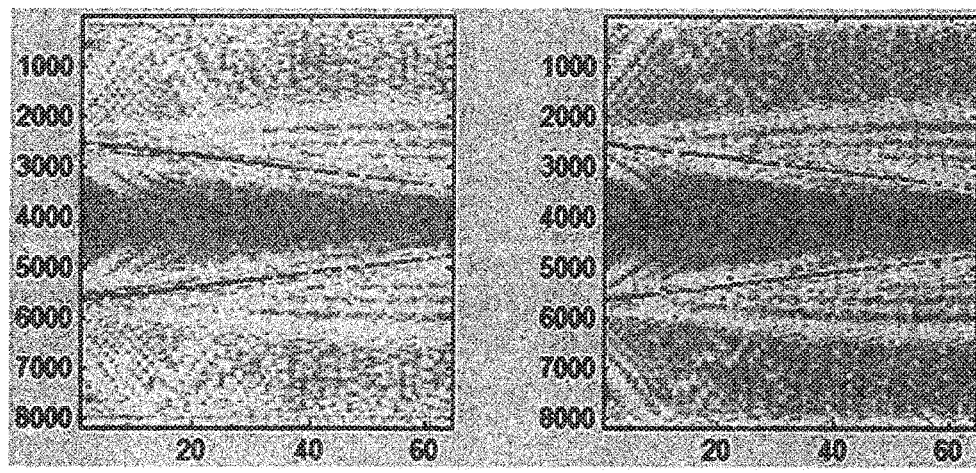
FIG. 4 shows spectrograms of all the ramps of the two transmitting-receiving units before synchronization.

Firstly individual spectrograms of the beat signals sigC12 and sigC21 are created for each receiving channel for each ramp. These spectrograms are placed side by side in the amplitude diagram without phase information for all N consecutive ramps. This is shown in FIG. 4 for the ascending ramps, in which two maxima appear since no IQ mixing was carried out but a real-value scanning signal is present. When used in primary radars, for this step the at least one reflector in the detection range must be identified in advance and represented as described previously.

Now the frequency band in which the beat signal is to be expected (ensured by a coarse pre-synchronization) is roughly cut out. Then in each case, the spectrogram of the first N/2 ramps is correlated with that of the second N/2 ramps along the frequency axis (step 1). The maximum thereby found reproduces the relative time drift of the two SEs (here a linear function can be assumed). When receiving the signals via one or more reflections, for example, the identification of the targets can be made by means of the opposite drift on both sides.

Alternatively, a determination of the frequency offset can also be made in particular in primary radars via a common bus system whereby the systems exchange their measurement signals or more extensive synchronization signals via the cable of a bus system. The bus system is in this case in particular a CAN, FlexRay, Most, Gigabyte Ethernet system, USB, Firewire or TTP system.

Then, all the ramps in the spectrogram are corrected by this drift, by multiplying, for example, with a complex correction signal having an opposite frequency offset in the unit for clock matching or comparative signal modification 2. The spectrograms of the various ramps thus obtained are (incoherently) added and as a result of the superposition, the maximum is sought which corresponds to the time offset (offset error). In primary radar, the identification of the related peaks made in the previous step can be used for the selection of the peaks.

Alternatively, a determination of the time offset can also be made via a common bus system, in particular either by transferring measurement data or suitable correlation sequences.

The parameters of the relative time offset determined in this way and relative time drift (=current frequency offset) are determined by means of the complete sequence of N ramps. This result contains a large part of the clock deviation. In addition, it is now known for each ramp and each station at which point in the spectrogram the energy of the incident signal is to be expected in each case.

The originally recorded local mixing signals sigC12 and sigC21 are now initially shifted by integer values Tint (representation of the time offset between the two stations as $\Delta T=|T01-T02|=Tint+Tfrac$) in order to obtain a uniform time basis. Due to the common time basis the phase noise is more strongly correlated. The remaining small time error Tfrac can now be compensated possibly by using a fractional delay filter. The signals thus shifted are now corrected by the different ramp steepness which occurs as a result of the frequency offset $\Delta\omega=\omega1-\omega2$ of the two local oscillators, by convolving or spectrally multiplying by a normalized correction signal, which corresponds to the frequency behaviour in the opposite direction.

In these resharpened mixing signals, a peak is sought in each case after an FFT of the beat signal for the channel pulse response. In the case of secondary radar, preferably the strongest peak or alternatively the first peak is taken, in primary radar a peak obtained equally on both sides must be selected. For each ramp at both stations a maximum is thus obtained with the estimated spacing with the appurtenant phase position. These values fundamentally agree for the measurement on the forward and return path in the case of a reciprocal channel. The remaining deviations can be attributed to remaining frequency and phase differences between both signal sources 1 of the SE, for example, of the oscillators whose phase noise forms the basic cause. The precise frequency difference can now be determined absolutely and therefore corrected (the phase difference can be determined up to 180° ambiguity (in the case of IQ mixers) 360°. This ambiguity is eliminated by a restriction of the phase profile to +/−90° from ramp to ramp, which is also designated as unwrapping. After this precise correction of the remaining phase error, the synthetic signals of both stations now scarcely differ.

After this pre-processing, the characteristic systematic errors of the radar system are completely corrected, which is why the phase shift of the two beat signals only differs by a small amount. At this point, on the one hand, a precise synchronization of the time and frequency base is achieved and on the other hand, the phase noise can be considered as an additive contribution and can be eliminated by linear combination. This is accomplished, for example, by means of 2D Fourier transformation of all N ramps at both SEs, whereupon finally the beat signals normalized in the amplitude are added. By incorporating the system parameters (scanning rate, ramp steepness, carrier frequency, . . . ), the maximum of the result of this linear combination forms the estimated value for this distance and speed.

Figure 5:
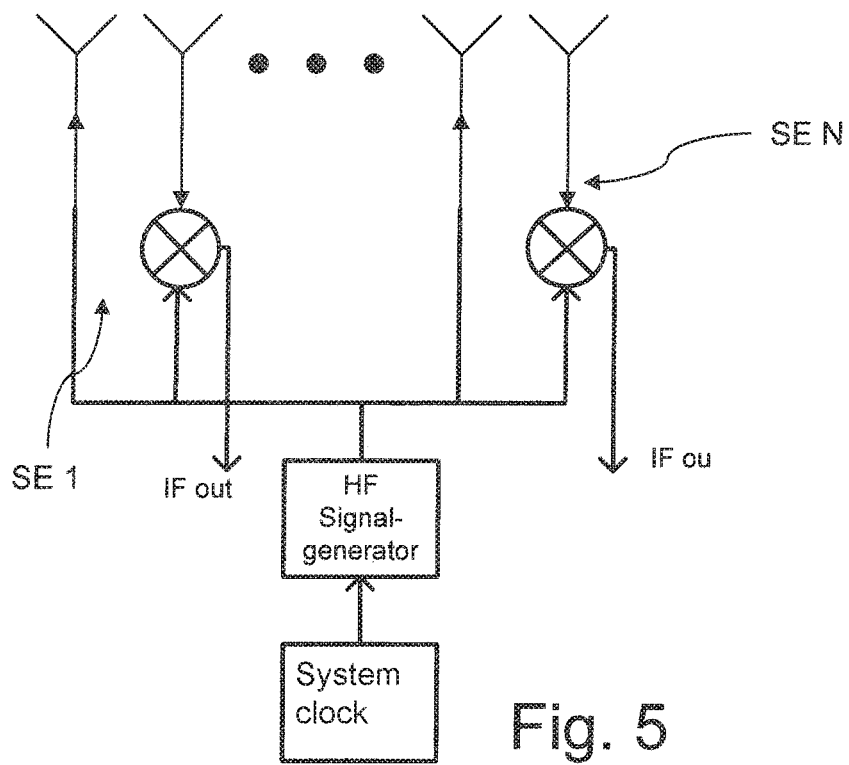
FIG. 5 shows a schematic diagram of a conventional radar array.

FIG. 5 shows as an example a conventional arrangement for a radar system with transmitting-receiving devices SE1, SE2, which each have at least two transmitting and receiving antennae as well as having an HF generator for the HF signal and a distributing device for distributing the HF signal to the transmitting-receiving devices SE1, SE2 and a clock generator for a system clock.

Figure 6:
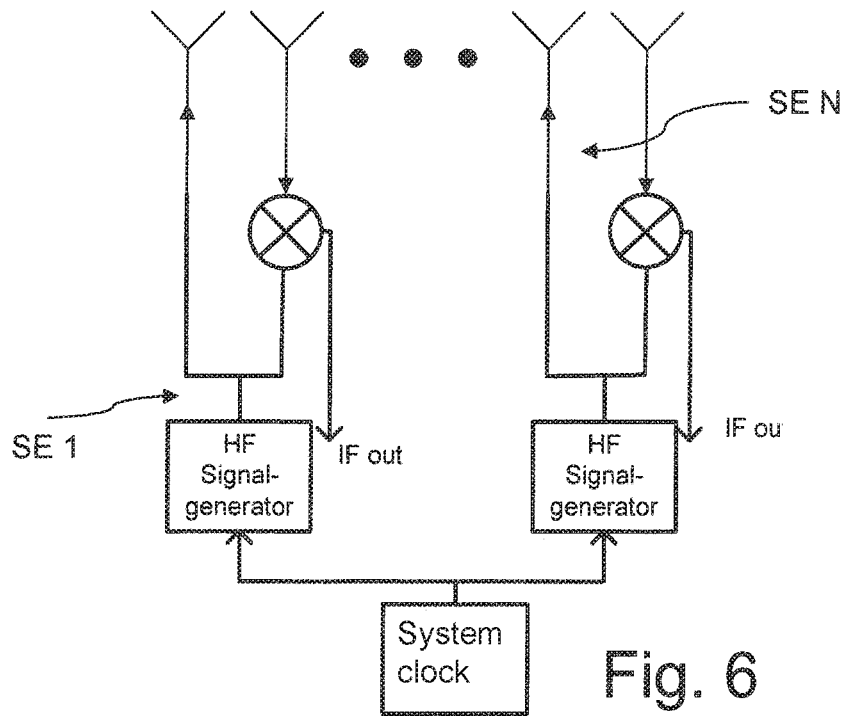
FIG. 6 shows a schematic diagram of a radar array according to the invention.

FIG. 6 shows an arrangement of a radar system according to the invention with transmitting-receiving devices SE1, SE2, which each have at least two transmitting-receiving antennae as well as an HF generator and having a (common) clock generator for a system clock.

Figure 7:
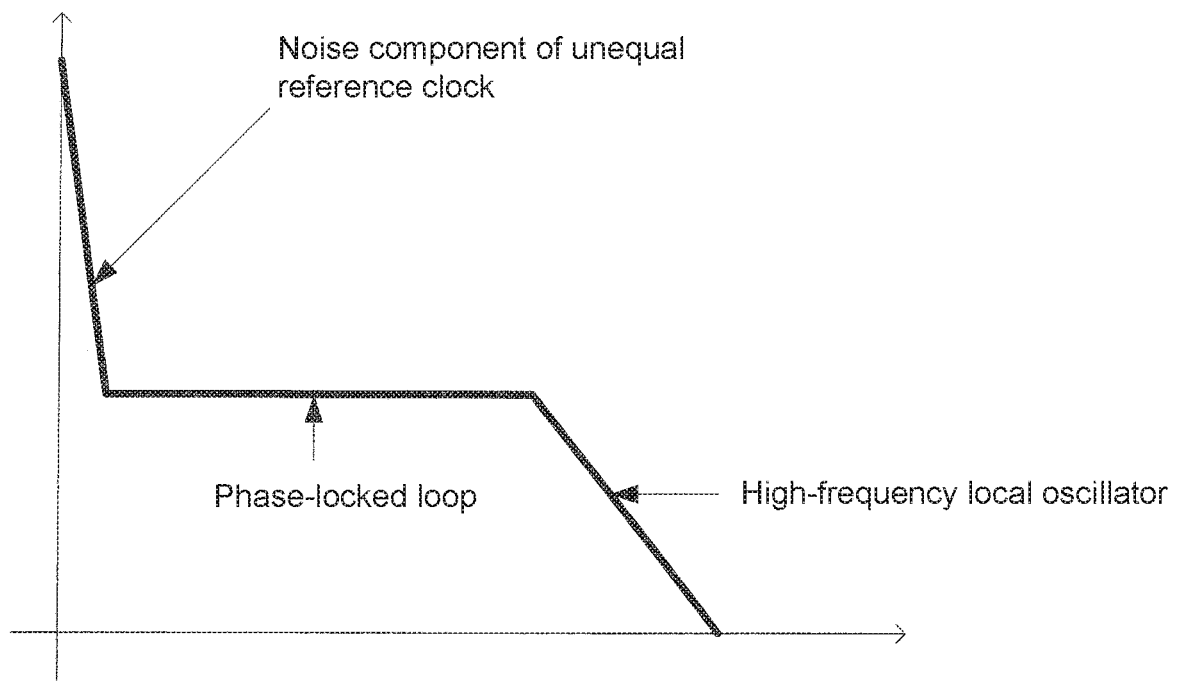
FIG. 7 shows a phase-noise diagram.

FIG. 7 shows a phase noise diagram for IF signals which originate from the down-mixing of signals from different signal generators such as can be obtained with a radar system according to FIG. 6 and the use of a suitable phase-locked loop but without a method for the subsequent production of coherence.

Figure 8:
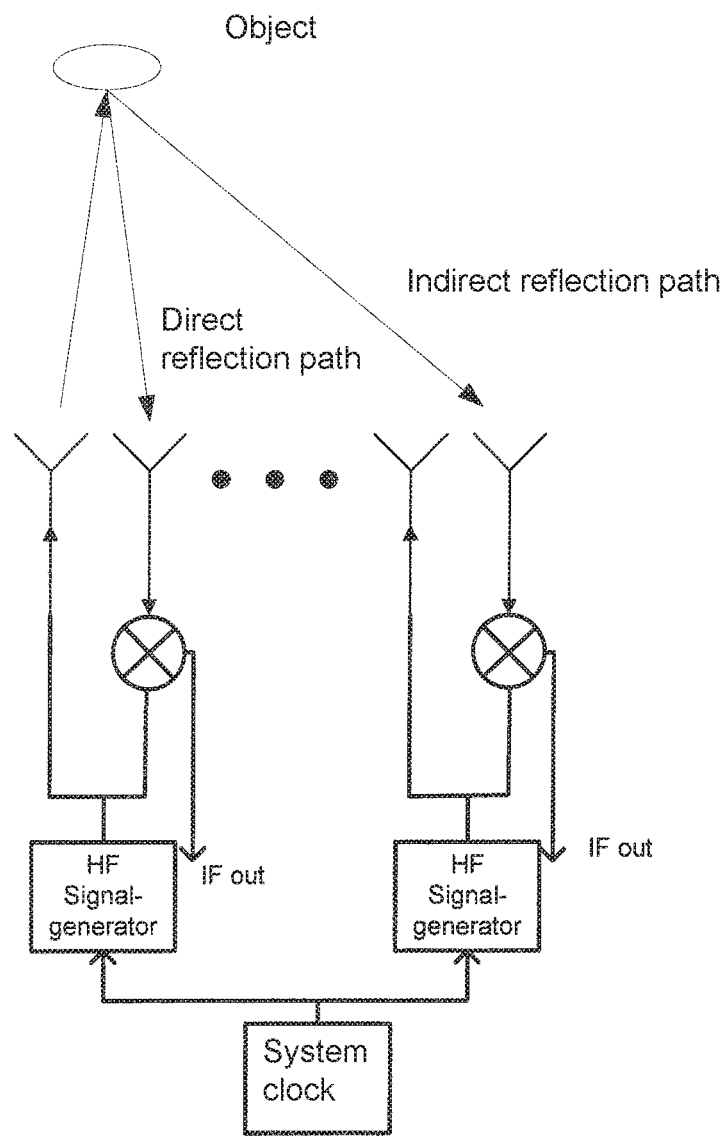
FIG. 8 shows a schematic diagram of direct and indirect signal paths.

FIG. 8 shows a signal propagation for the radar system according to the invention. The signals received from each receiving path contain the dedicated signals reflected by the surroundings and the signals of the second transmission path reflected by the surroundings.

The received signals are down-mixed or correlated with the local high-frequency signal. This results in a low-frequency signal $S1_{beat}$ which has both components from the direct reflection path (dedicated transmission signal) and from the indirect reflection path (external transmission signal). This is followed by a separation of the signal by means of the frequency difference or another type of modulation. The signals of the dedicated reflection path are then processed as normal radar signals, the signals of the indirect path are further processed as follows:

Optionally, the indirect signals from both receiving paths are corrected by some frequency offset. In addition to the frequency offset, which was possibly introduced to distinguish/code the two signals, frequency offsets can also be perturbing system-induced frequency offsets. However, correction of the latter is usually not necessary as a result of the common clock source. Timing offsets, for example, due to (slightly) different times of the HF generators (frequency generators) are also corrected, for example, in the post processing by (for example) applying DE 101 57 931. Two spectra (spectrum I and spectrum II) can then be formed by both signals and preferably normalized in relation to their amplitudes. By means of a mathematical operation, the sum or the difference of the complex spectra or of signals which were derived from the spectra, are formed or the sum or the difference of phase values of the aforesaid signals is formed.

A preferred variant of the evaluation can proceed as follows: one of the two calculated spectra (spectrum I) is preferably converted into a complex conjugate spectrum (spectrum 1C). This spectrum (spectrum 1C) and the non-complex-conjugate converted spectrum (spectrum 1) are added or subtracted or multiplied or divided in a mathematical operation. The resulting spectrum can then be processed as a normal radar spectrum.

It is advantageous that due to the mathematical combination of the two signals (spectrum 1 and spectrum 2), the additional noise which was produced by the use of the separate HF signal sources can be very effectively suppressed.

It is particularly preferred if the transmitting-receiving paths are arranged as sparse arrays. By this means, auxiliary maximum and complete aperture can be optimized so that accuracy and target separation can be significantly improved. Likewise preferred is the use of chips which comprise already-integrated antennae, either in the chip directly or in a corresponding package.

Aspects and embodiments of method I or configuration I are described hereinafter. The reference numbers relate to the figures from DE 10 2014 104 273 A1. The transmitting-receiving units can be part of (optionally at least partially coherent) transmitting-receiving devices or can form these:

1st aspect: Method in a radar system, in which
in a first (non-coherent) transmitting-receiving unit (SE1), a first signal (sigTX1) is generated and transmitted over a path (SP), in particular emitted
in a further, in particular second (non-coherent) transmitting-receiving device (SE2), a first signal (sigTX2) is generated and transmitted over the path (SP), in particular emitted,
in first transmitting-receiving unit (SE1), a comparative signal (sigC12) is formed from the first signal (sigTX1) and from such a first signal (sigTX2) received from the second transmitting-receiving unit (SE2) via the path (SP) and in the further transmitting-receiving device (SE2), a further comparative signal (sigC21) is formed from the first signal and from such a first signal (sigTX1) received from the first transmitting-receiving unit (SE1) via the path (SP),
wherein the further comparative signal (sigC21) is preferably transmitted, in particular communicated, from the further transmitting-receiving unit (SE2) to the first transmitting-receiving unit (SE1).

2nd aspect: method according to the first aspect, in which a comparative-comparative signal (sigC21; sigC12) is formed from this comparative signal (sigC21) and the further comparative signal (sigC21).

3rd aspect: method according to the second aspect, in which the comparative-comparative signal (sigC21; sigC12) by processing together, in particular by complex-conjugate multiplying the two comparative signals (sigC21; sigC12), corresponds to a comparative signal generated with a coherent radar system.

4th aspect: method according to a preceding aspect, in which at least one of the comparative signal (sigC12), the further comparative signal (sigC21) or the comparative-comparative signal (sigC21; sigC12) is formed by at least one of mixing or correlation.

5th aspect: method according to a preceding aspect, in which at least one such further comparative signal (sigC21; sigC12) is transmitted between the transmitting-receiving units (SE2; SE1) as at least one of data, a data-containing signal or a signal containing data reconstructably.

6th aspect: method according to a preceding aspect, in which at least one of the first signals (sigTX1, sigTX2) is sent as a transmission signal via the path (SP) formed as an air interface.

7th aspect: method according to a preceding aspect, in which times for sending the first signals (sigTX1, sigTX2) are coordinated in such a manner that the first signals (sigTX1, sigTX2) overlap at least partially in time.

8th aspect: method according to a preceding aspect, in which from at least one comparative-comparative signal (sigC21; sigC12), a signal transit time (T12) required by such a first signal (sigTX1, sigTX2) for the path between the transmitting-receiving units (SE1, SE2) is determined by analysing at least one phase or a phase value ($\varphi 12$, $\varphi 13$, ..., $\varphi 1N$, $\varphi 22$, $\varphi 23$, $\varphi 24$, ..., $\varphi 2N$, ..., $\varphi N-N$) of a frequency, an amplitude profile or a phase profile of the comparative-comparative signal (sigCC12).

9th aspect: method according to a preceding aspect, in which at least one of the first signals (sigTX1, sigTX2) is generated and sent as an FMCW or OFDM-modulated signal.

10th aspect: method according to a preceding aspect, in which at least one of the first signals (sigTX1, sigTX2) is generated and sent as a multi-ramp signal.

11th aspect: method according to a preceding aspect, in which
a plurality of comparative-comparative signals (sigC21; sigC12) which are measured temporally successively with at least two transmitting-receiving units (SE1, SE2) of which at least one of the transmitting-receiving units (SE1, SE2) moves and
by means of a synthetic aperture method at least one of a distance, a position, a speed or the presence of one of the transmitting-receiving units (SE1, SE2) or the presence of one such transmitting-receiving units (SE1, SE2) or at least one of a distance, a position, a speed relative to an object (O) or the presence of an object (O) is determined.

12th aspect: radar system in which
at least one first (non-coherent) transmitting-receiving unit (SE1) is configured to generate a first signal (sigTX1) and send it, in particular emit it via a path (SP),
at least one further, in particular second (non-coherent) transmitting-receiving unit (SE2) is configured to generate a first signal (sigTX2) and send it, in particular emit it via the path (SP),
the first transmitting-receiving unit (SE1) is configured to form a comparative signal (sigC12) from the first signal (sigTX1) thereof and from such a first signal (sigTX2) received from the further transmitting-receiving unit (SE2) via the path (SP),
the further transmitting-receiving unit (SE2) is configured to form a further comparative signal (sigC21) from the first signal (sigTX2) thereof and from such a first signal (sigTX1) received from the transmitting-receiving unit (SE1) via the path (SP) and
the further comparative signal (sigC21) is transmitted, in particular communicated from the further transmitting-receiving unit (SE2) to the first transmitting-receiving unit (SE1).

13th aspect: radar system according to aspect 12, in which a comparative-comparative signal (sigC21; sigC12) is formed from this comparative signal (sigC21) and the further comparative signal (sigC21).

14th aspect: radar system according to aspect 12 or 13, with three or more spatially spaced-apart transmitting-receiving units (SE1, SE2, SE3, . . . , SE-N) in which from two or more comparative-comparative signals (sigCC12, sigCC12, sigCC13, sigCC22, . . . , sigCC32) which are measured with more that two pairs of respectively two of the spatially spaced-apart transmitting-receiving units (SE1, SE2; SE-N, SE2), a distance, a position, a speed or the presence of one of the transmitting-receiving units (SE1, SE2) or the presence of one such transmitting-receiving unit (SE2, SE1) or at least one of a distance, a position, a speed relative to an object (O) or the presence of an object (O) is determined.

15th aspect: radar system according to one of aspects 12 to 14, in which the first transmitting-receiving unit (SE1) and at least one such further transmitting-receiving unit (SE2) and/or an evaluation device (P) are configured to carry out a method according to one of the preceding claims.

16th aspect: apparatus of a radar system, in particular for carrying out a method according to one of aspects 1 to 11 and/or in a radar system according to one of aspects 12 to 15, wherein the apparatus
is configured as a first (non-coherent) transmitting-receiving unit (SE1), in particular a first (non-coherent) transmitting-receiving unit (SE1) and
has a signal generator and at least one antenna (TA1; RA1) configured to generate a first signal (sigTX1) to send, in particular emit, over a path (SP),
has an arrangement configured to form a comparative signal (sigC12) from the first signal (sigTX1) and from such a first signal (sigTX2) received from the further transmitting-receiving unit (SE2) via the path (SP)
and has at least one of
an interface (CommTX) which is configured to transmit, in particular communicate the comparative signal (sigC12) to the further transmitting-receiving unit (SE2) or
has an interface (CommRX) which is configured to obtain such a further comparative signal (sigC21) generated by the further transmitting-receiving unit (SE2) by means of transmitting, in particular communicating, in the first transmitting-receiving unit (SE1).

17th aspect: apparatus according to aspect 16 with a further comparison unit (sigComp12, which forms a comparative-comparative signal (sigCC12) from the comparative signal (sigC21) formed in the same transmitting-receiving unit (SE1) and the comparative signal (sigC21) transmitted to this transmitting-receiving unit (SE1).

18th aspect: apparatus according to aspect 16 or 17, in which the at least one interface (CommTX, CommRX) is a data interface.

19th aspect: apparatus according to one of aspects 16 to 18 in which between the arrangement which outputs the comparative signal (sigC12) and the further comparison unit (sigComp12) which forms the comparative-comparative signal (sigCC12), a filter (FLT) is arranged, wherein the filter (FLT) applies the comparative signal (sigC12) to the comparison unit (sigComp12), wherein the filter (FLT) does not apply a further comparative signal (sigC11) formed in the arrangement upstream of the filter (FLT) and suppresses or provides to a connection the comparative signal (sigC11) formed in the upstream arrangement.

20th aspect: apparatus according to one of aspects 16 to 19 which comprises a plurality of spatially spaced-apart receiving antennae (RA1,1, . . . , RA1,N: RA2,1, . . . , RA2,N) to which respectively one arrangement is assigned, which is configured to form respectively one comparative signal (sigC21,1, sigC21,2, sigC21,3) from the first signal (sigTX2) and from such a first signal (sigTX1) received from such a further transmitting-receiving unit (SE2) via the path (SP).

Aspects and embodiments of method II or configuration II are described hereinafter. The reference numbers relate to FIGS. 1 to 4 of the present application. The transmitting-receiving units can be part of (optionally at least partially coherent) transmitting-receiving devices or can form these:

1st aspect: Method for reducing perturbations by phase noise in a radar system in which
in a first (non-coherent) transmitting-receiving unit (SE1), a first signal (sigTX1) is generated and transmitted over a path (SP), in particular emitted
in a further, in particular second (non-coherent) transmitting-receiving device (SE2), a first signal (sigTX2) is generated and transmitted over the path (SP), in particular emitted,
the first signals (sigTX1 and sigTX2) are received in the respectively other transmitting-receiving unit by a direct or indirect path and are further processed there as receiving signals (sigRX12 and sigRX21),
in first transmitting-receiving unit (SE1), a comparative signal (sigC12) is formed from the first signal (sigTX1) and from such a first signal (sigRTX2) received from the further transmitting-receiving unit (SE2) via the path (SP) and
in the further transmitting-receiving device (SE2), a further comparative signal (sigC21) is formed from the first signal (sigTX2) and from such a first signal (sigTX1) received from the first transmitting-receiving unit (SE1) via the path (SP),
wherein the further comparative signal (sigC21) is preferably transmitted, in particular communicated, from the further transmitting-receiving unit (SE2) to the first transmitting-receiving unit (SE1),
wherein in a first step deviations of the comparative signals (sigC21 and sigC12) caused by systematic deviations in the transmitting-receiving units (SE2, SE1) are compensated, wherein in a second step at least one complex value from one of the two comparative signals or from one signal which was derived from this first comparative signal is used to adapt at least one complex value of the second of the comparative signals or a value of a signal which was derived from this second comparative signal, and thus form an adapted signal (sigCC), wherein the adaptation is accomplished in such a manner that by means of a mathematical operation, the vectorial sum or the difference of the complex values is formed or the sum or the difference of the phases of the complex values is formed.

2nd aspect: method according to aspect 1, wherein the transmitted signals (sigTX1 and sigTX2) FMCW are modulated.

3rd aspect: method according to aspect 1 or 2, wherein a clock rate matching, in particular of signal sources of the first signals (sigTX1 and sigTX2) is carried out via a bus system, preferably a communication bus and/or wherein a clock rate matching, in particular of clock rates of signal sources of the first signals (sigTX1 and sigTX2) is carried out via radio waves and/or via a cable connection, in particular during operation as primary radar.

4th aspect: method according one of the preceding aspects, wherein a synchronization of the (non-coherent) transmitting-receiving units SE1, SE2) in particular a pre-synchronization is carried out by determining a frequency drift via several ramps successively, in particular when using a secondary radar.

5th aspect: method according one of the preceding aspects, wherein an offset, in particular a time offset and/or a frequency offset is determined via a bus system, preferably during operation as primary radar.

6th aspect: method according one of the preceding aspects, wherein an/the offset, in particular a/the time offset and/or a/the frequency offset is determined via an evaluation of a position of, in particular, corrected maxima of the spectra of the comparative signals (sigC12 and sigC21).

7th aspect: method according one of the preceding aspects, wherein the first and/or the further (non-coherent) transmitting-receiving unit comprises at least one evaluation device for carrying out the individual process steps, in particular calculations and evaluations, wherein the respective evaluation device is possibly a physically independent evaluation device which is connected to the respective transmitting-receiving unit or the other components of the respective transmitting-receiving unit or possibly is integrated in the first and/or the further (non-coherent) transmitting-receiving unit, for example, in a common housing and/or as a structural component.

8th aspect: method according one of the preceding aspects, wherein the comparative signals (sigC12 and sigC21) are transmitted to an, in particular, common evaluation unit and are both present there for evaluation, wherein the common evaluation unit is optionally the first (non-coherent) transmitting-receiving unit (SE1) or optionally the second (non-coherent) transmitting-receiving unit (SE2) or optionally another, in particular separate evaluation unit.

9th aspect: method according one of the preceding aspects, wherein the first signals (TX1 and TX2) are sent at least in a temporally overlapping manner, wherein the further first signal (TX2) of the further (non-coherent) transmitting-receiving unit (SE2) is preferably sent at least during half the signal duration of the first signal (TX1) of the first (non-coherent) transmitting-receiving unit (SE2), further preferably at least approximately simultaneously.

10th aspect: method according one of the preceding aspects, wherein before the mathematical operation, the spectra of the comparative signals are normalized to the highest value.

11th aspect: system for reducing perturbations by phase noise in a radar system with units for carrying out the method according to one of the preceding claims, in particular comprising:

a first (non-coherent) transmitting-receiving unit (SE1) to generate a first signal (sigTX1) and send, in particular emit, the first signal (sigTX1) via a path (SP), a further, in particular second, (non-coherent) transmitting-receiving unit (SE2) to generate a first signal (sigTX2) and send (in particular emit) the first signal (sigTX2) via the path (SP), wherein the (non-coherent) transmitting-receiving units (SE1 and SE2) are configured to receive the first signals (sigTX1 and sigTX2) in a direct or indirect path and further process them there as receiving signals (sigRX12 and sigRX21), wherein the first transmitting-receiving unit (SE1) is configured to form a comparative signal (sigC12) from the first signal (sigTX1) thereof and from a first signal (sigTX2) received from the further transmitting-receiving unit (SE2) via the path (SP), wherein the further transmitting-receiving unit (SE2) is configured to form a further comparative signal (sigC21) from the first signal (sigTX2) thereof and from such a first signal (sigTX1) received from the first transmitting-receiving unit (SE1) via the path (SP), wherein a transmission unit is provided to transmit, in particular to communicate the further comparative signal (sigC21) from the further transmitting-receiving unit (SE2) to the first transmitting-receiving unit (SE1), wherein at least one evaluation unit is provided which is configured to compensate, in a first step, for deviations of the comparative signals (sigC21 and sigC12) caused by systematic deviations in the transmitting-receiving units (SE2, SE1) and in a second step, to use at least one complex value from a first of the two comparative signals or from a signal which was derived from this first comparative signal to adapt at least one complex value of the second of the two comparative signals or a value of a signal which was derived from this second comparative signal, and thus form an adapted signal (sigCC) wherein the adaptation is performed in such a manner that by means of a mathematical operation the vectorial sum or the difference of the complex values is formed or the difference of the phases of the complex values is formed.

12th aspect: system according to aspect 11, wherein a bus system, in particular a communication bus, is provided for a clock rate matching, in particular of signal sources of the first signals (sigTX1 and sigTX2), and/or wherein a bus system is provided for determining an offset, in particular time offset and/or frequency offset.

13th aspect: system according to one of aspects 11 or 12, wherein a common transmitting and receiving antenna is provided in the first and/or further (non-coherent) transmitting-receiving unit (SE1 and/or SE2) and/or wherein a transmission mixer is provided in the path (SP).

14th aspect: use of the method according to one of claims 1 to 10, for a system having at least one common transmitting and receiving antenna in the first and/or second (non-coherent) transmitting-receiving unit (SE1 and/or SE2).

15th aspect: use of the system according to one of aspects 11 to 13 to reduce perturbations due to phase noise in a radar system.

At this point, it should be pointed out that all the parts or functions described above when viewed by themselves alone or in any combination, in particular the details shown in the drawings, are claimed as essential to the invention. Modifications thereof are familiar to the person skilled in the art.

Figure 3:
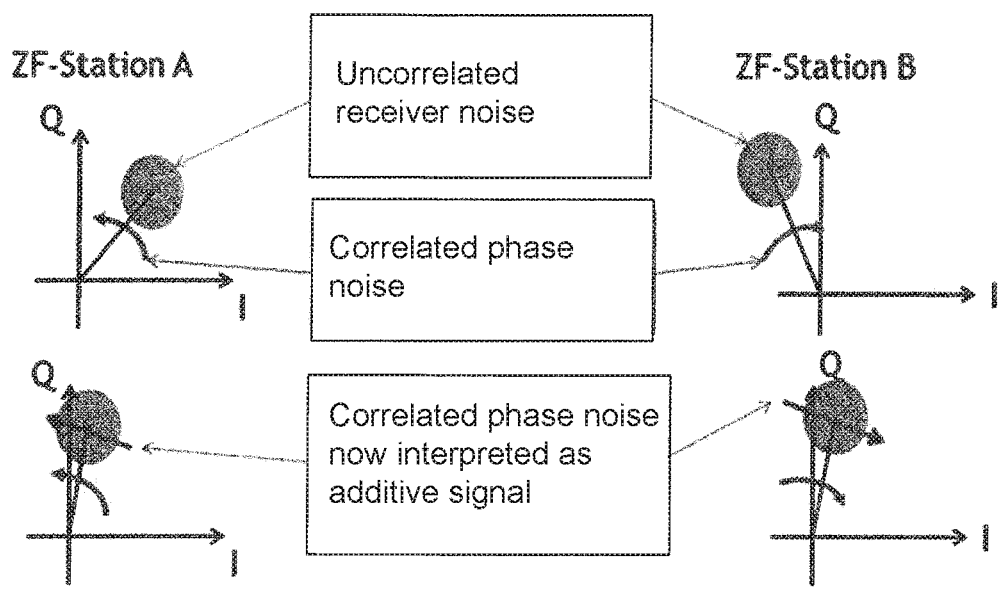
FIG. 3 shows at the top beat signals of the two transmitting-receiving units with non-correlated noise components before synchronization and at the bottom, a synthetic mixed product with correlated phase noise after synchronization.

FIG. 3
Uncorrelated receiver noise
Correlated phase noise
Correlated phase noise now interpreted as additive signal
FIG. 4
Beat signals of all ramps: NKSE1
Beat signals of all ramps: NKSE2
FIG. 5
HF signal generator
System clock
FIG. 6
HF signal generator
HF signal generator
System clock
FIG. 7
Noise component of unequal reference clock
Phase-locked loop
High-frequency local oscillator
FIG. 8
Object
Indirect reflection path
Direct reflection path
HF signal generator
HF signal generator
System clock

The invention claimed is:

1. A radar system comprising:
a first (SE1) transmitting-receiving device and a second (SE2) transmitting-receiving device, each having a transmitting antenna, a receiving antenna, and a high frequency (HF) generator; and
a common clock generator to feed the HF generators of the transmitting-receiving devices,
wherein at least one of the first (SE1) transmitting receiving device, the second (SE2) transmitting-receiving device, or a separate evaluation device comprising a processor is configured to process transmitting and receiving signals of the transmitting-receiving devices (SE1, SE2) to provide measurement signals with increased coherence in comparison with the transmitting and receiving signals of the transmitting-receiving devices (SE1, SE2).

2. The system according to claim 1, wherein the first (SE1) transmitting-receiving device and its HF generator or the second (SE2) transmitting-receiving device and its HF generator is arranged on a printed circuit board, together with the common clock generator.

3. The system according to claim 1, wherein the HF generators are arranged in the vicinity of the transmitting and receiving antennae.

4. The system according to claim 1, comprising a phase locked loop to enhance coherence of the HF signals of respective HF generators.

5. The system according to claim 1, wherein
the first (SE1) transmitting-receiving device is configured to generate a first signal (sigTX1) for transmission over a path (SP),
the second (SE2) transmitting-receiving device is configured to generate a further first signal (sigTX2) for transmission over the path (SP),
in the first (SE1) transmitting-receiving device is configured to form a first comparative signal (sigC12) from the first signal (sigTX1) of the first (SE1) transmitting-receiving device and from the further first signal (sigTX2) received from the second (SE2) transmitting-receiving device via the path (SP); and
the second (SE2) transmitting-receiving device is configured to form a further comparative signal (sigC21) from the further first signal of the second (SE2) transmitting-receiving device (sigTX2) and from the first signal (sigTX1) received from the first (SE1) transmitting-receiving device via the path (SP),
wherein the second (SE2) transmitting-receive device is configured to transmit the further comparative signal (sigC21) to the first (SE1) transmitting-receiving device.

6. The system according to claim 5, wherein at least one of the first (SE1) transmitting-receiving device, the second (SE2) transmitting-receiving device, or the evaluation device is configured to form another comparative signal from the first comparative signal (sigC12) and the further comparative signal (sigC21).

7. The system according to claim 5, wherein at least one of the first (SE1) transmitting-receiving device, the second (SE2) transmitting-receiving device, or the evaluation device is configured to compensate for deviations of the first and second comparative signals which are caused by systematic deviations in the transmitting-receiving devices (SE2, SE1), and to use at least one complex value from the first of the two comparative signals or from a signal which was derived from this first of the two comparative signals, to adapt at least one complex value of the second of the two comparative signals or a value of the second signal which was derived from this second comparative signal, and thus form an adapted signal (sigCC), wherein the adaptation comprises forming a vectorial sum or a difference of the complex values or forming a sum or a difference of phases of the complex values.

8. The system according to claim 1, wherein the first (SE1) transmitting-receiving device or the second (SE2) transmitting-receiving device comprises two or more transmitting antennae two or more receiving antennae.

9. The system according to claim 1, wherein the transmitting-receiving devices (SE1, SE2) are arranged spatially as a sparse array.

10. The system according to claim 1, wherein the first (SE1) transmitting device and the second (SE2) transmitting-receiving device are configured to transmit simultaneously or in a time-overlapping manner so that transmission signals of the first (SE1) transmitting device and the second (SE2) transmitting-receiving device differ from one another.

11. The system according to claim 1, wherein at least one of the first (SE1) transmitting-receiving device, the second (SE2) transmitting-receiving device, or the evaluation device is configured to:
mix or correlate the received signals; and
separate the received signals on the basis of a distinguishing feature.

12. The system according to claim 1, wherein at least one of the first (SE1) transmitting-receiving device, the second (SE2) transmitting-receiving device, or the evaluation device is configured to: form complex-valued spectra of indirect reflected signals received from the transmitting-receiving devices (SE1, SE2), wherein a sum or a difference of the complex-valued spectra is formed or a sum or a difference of phase values of the indirect reflected signals received from the transmitting-receiving devices is formed.

13. A method for operating a radar system, the method comprising:
    transmitting a signal from a first (SE1) transmitting-receiving device and a second (SE2) transmitting-receiving device, each having a transmitting antenna, a receiving antenna, and a high frequency (HF) generator; and
    using at least one of the first (SE1) transmitting receiving device, the second (SE2) transmitting-receiving device, or a separate evaluation device comprising a processor, processing the transmitted and received signals of the transmitting-receiving devices (SE1, SE2) to provide measurement signals with increased coherence in comparison with the transmitted and received signals of the transmitting-receiving devices (SE1, SE2);
    wherein a common clock generator is used for feeding the HF generators of the transmitting-receiving devices (SE1, SE2).

14. The method according to claim 13, wherein
    in the first (SE1) transmitting-receiving device, a first signal (sigTX1) is generated and transmitted over a path (SP),
    in a second (SE2) transmitting-receiving device, a further first signal (sigTX2) is generated and transmitted over the path (SP),
    a first comparative signal (sigC12) is formed from the first signal (sigTX1) of the first (SE1) transmitting-receiving device and from the first signal (sigTX2) received from the second (SE2) transmitting-receiving device via the path (SP), and
    a further comparative signal (sigC21) is formed from the first signal of the second (SE2) transmitting-receiving device (sigTX2) and from such a first signal (sigTX1) received from the first (SE1) transmitting-receiving device via the path (SP), and
    wherein the further comparative signal (sigC21) is transmitted, from the second transmitting-receiving device (SE2) to the first transmitting-receiving device.

15. The method according to claim 14, wherein at least one of the first (SE1) transmitting-receiving device or the second (SE2) transmitting-receiving device compensates for deviations of the first and second comparative signals which are caused by systematic deviations in the transmitting-receiving devices (SE2, SE1), and using at least one complex value from the first of the two comparative signals or from a signal which was derived from this first comparative signal, to adapt at least one complex value of the second of the two comparative signals or a value of the first signal which was derived from this second comparative signal, and thus form an adapted signal (sigCC), wherein the adaptation comprises forming a vectorial sum or a difference of the complex values or forming a sum or a difference of phases of the complex values.

* * * * *